(12) United States Patent
Ramakrishnan et al.

(10) Patent No.: US 7,726,402 B2
(45) Date of Patent: Jun. 1, 2010

(54) METHODS FOR DOWNHOLE SEQUESTRATION OF CARBON DIOXIDE

(75) Inventors: Terizhandur S. Ramakrishnan, Boxborough, MA (US); Romain De Loubens, Cambridge, MA (US); Yusuf Bilgin Altundas, Malden, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 36 days.

(21) Appl. No.: 12/167,512

(22) Filed: Jul. 3, 2008

(65) Prior Publication Data

US 2010/0000737 A1    Jan. 7, 2010

(51) Int. Cl.
    *B65G 5/00*    (2006.01)
(52) U.S. Cl. ...................... 166/305.1; 405/53
(58) Field of Classification Search .......... 166/305, 166/1; 405/53; 518/726
    See application file for complete search history.

(56) References Cited

U.S. PATENT DOCUMENTS

| | | | | |
|---|---|---|---|---|
| 3,330,352 A | * | 7/1967 | Bernard | ........................ 166/263 |
| 7,021,063 B2 | * | 4/2006 | Viteri | ........................... 60/791 |
| 2003/0131582 A1 | * | 7/2003 | Anderson et al. | ........... 60/39.55 |
| 2004/0200618 A1 | * | 10/2004 | Piekenbrock | ............. 166/305.1 |
| 2006/0058402 A1 | * | 3/2006 | Highgate | ..................... 518/726 |
| 2007/0261844 A1 | | 11/2007 | Cogliandro et al. | |

FOREIGN PATENT DOCUMENTS

| | | | |
|---|---|---|---|
| EP | 1801346 | * | 6/2007 |
| WO | 2008073765 A2 | | 6/2008 |

OTHER PUBLICATIONS

Brooks, R.N., et al., Properties of Porous Media Affecting Fluid Flow, Journal of the Irrigation and Drainage Division, Proceedings of the American Society of Civil Engineers, Jun. 1966, IR 2, pp. 61-88.
Celia, M.A. et al., Geologic Storage of CO2: Leakage Pathways and Environmental Risks, Princeton University and Alberta Geological Survey, May 2000, pp. 1-13.
Ramakrishnan, T.S., et al., Formation producibility and fractional flow curves from radial resistivity variation caused by drilling fluid invasion, Physics of Fluids, American Institute of Physics, Apr. 1997, vol. 9 Issue 4, pp. 833-844.
Patent Cooperation Treaty International Search Report, Form PCT/ISA/210, Date of mailing Feb. 3, 2010, pp. 1-3.

* cited by examiner

*Primary Examiner*—William P Neuder
(74) *Attorney, Agent, or Firm*—Vincent Loccisano; James McAleenan; Brigid Laffey

(57) ABSTRACT

Carbon dioxide is sequestered in a formation using a dual completion and injection method that reduces or eliminates upward leak rates of the sequestered carbon dioxide. The dual completion and injection method involves the injection of a benign fluid such as brine (water) into a permeable layer of the formation located above the sequestration layer and which is separated form the sequestration layer by a nearly impermeable layer. The water is preferably injected at the same time the carbon dioxide is injected.

17 Claims, 5 Drawing Sheets

METHODS FOR DOWNHOLE SEQUESTRATION OF CARBON DIOXIDE

BACKGROUND OF THE INVENTION

1. Field of the Invention

This invention relates broadly to carbon dioxide sequestration. More particularly, this invention relates to methods for reducing leakage of sequestered carbon dioxide.

2. State of the Art

Accumulating greenhouse gases have led to the advocation of separating and storing (sequestering) carbon dioxide from its sources. Carbon dioxide sequestration typically entails four distinct steps: the capture of the carbon dioxide from sources such as flue gas, transportation of the carbon dioxide to its ultimate storage site area, compression, and injection of the supercritical carbon dioxide downhole into the formation at a desired location (interval). Central to the success of the sequestration is the integrity of the downhole storage location; i.e., is the location sufficiently bounded by impermeable layers and seals. Because carbon dioxide is buoyant, particular attention is paid to the layer above the injected interval. For sequestration to be successful, any leak from the sequestration site must be inconsequential to inhabitants in the vicinity of the site. This is not exclusive to atmospheric leaks, but also to leaks into potable aquifers.

Generally, it is believed to be desirable to have more than one impermeable boundary between a selected injection (sequestration) zone and a potable aquifer. Thus, for example, assume with respect to FIG. 1 that a preferred injection zone is layer 0. Layer 0 is defined as being between $z=0$ and $z=z_0$ where z is the vertical coordinate. Layer 0 is capped by a nearly impermeable layer 1 whose permeability is substantially smaller than layer 0 (preferably at least three orders of magnitude smaller) and is often in the range of ten or fewer microdarcies. Layer 1 is defined as being between $z=z_0$ and $z=z_1$. Above layer 1 is a permeable stratum, layer 2, which is defined as being between $z=z_1$ and $z=z_2$. Layer 2 in turn is assumed to be overlain by another nearly impermeable shale or shaly sand. With this arrangement, it would be generally assumed that a potable aquifer above layer 2 would be sufficiently protected.

SUMMARY OF THE INVENTION

According to the invention, a dual completion and injection method is provided that reduces or eliminates upward leak rates of sequestered carbon dioxide. The dual completion and injection method involves the injection of a benign fluid such as brine or water into a permeable layer of the formation located above the sequestration layer and separated by a nearly impermeable layer (cap-rock). For purposes of this specification and the claims, hereinafter, the term "water" will be used in lieu of "brine" or "benign fluid", as the brine and benign fluid will typically contain water. The water is preferably injected at the same time the supercritical carbon dioxide is injected. Simultaneous injection is preferably accomplished via a dual completion. The water is injected at a selected pressure.

According to one aspect of the invention, the wellbore sections communicating with the adjacent layers of the formation that are to receive the carbon dioxide and the water are provided with their own pressure sensor. The water is injected into its layer at a pressure at most equal to that of the sequestration layer corrected for the gravitational head of the respective fluids.

According to another aspect of the invention, the water is injected into its layer at a pressure between the pressure which is equal to that of the sequestration layer corrected for the gravitational head of the respective fluids minus an entry capillary pressure of carbon dioxide into the nearly impermeable cap-rock layer, and the pressure equal to the gravity head corrected value. In a preferred embodiment, the water is injected into its layer at a pressure which is equal to that of the sequestration layer corrected for the gravitational head of the respective fluids minus one-half the entry capillary pressure of carbon dioxide into the nearly impermeable cap-rock layer.

According to a further aspect of the invention, only a portion of the zone directly above the cap-rock layer is perforated for injection of water. When only a portion of the zone is perforated, preferably, the portion that is perforated is the portion directly adjacent the nearly impermeable cap-rock layer.

According to yet another aspect of the invention, the entire zone adjacent the cap-rock layer is perforated for fluid injection. If the fluid is of the same density as the formation fluid, then the entire zone would be uniformly flooded if the formation is homogeneous. Alternatively, perforation may be conducted along at least half of the zone such that the fluid spreads into the entire zone more readily than with a small length of perforation.

Objects and advantages of the invention will become apparent to those skilled in the art upon reference to the detailed description taken in conjunction with the provided figures.

DETAILED DESCRIPTION OF THE PREFERRED EMBODIMENTS

Figure 1:
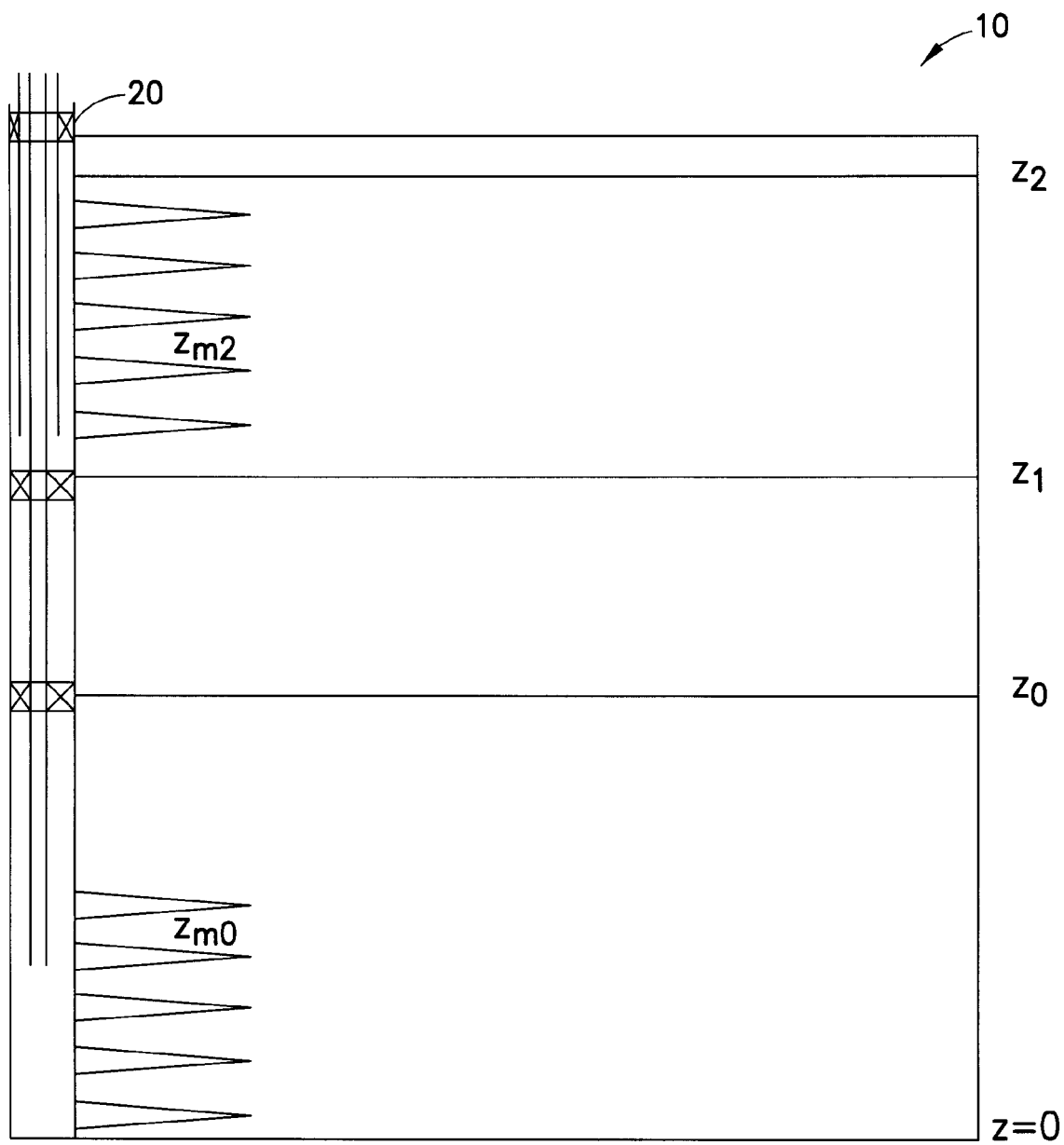
FIG. 1 is a schematic diagram of a sample formation having multiple layers.

Turning now to FIG. 1, a formation 10 traversed by a cased wellbore 20 is posited. Formation 10 includes many layers or zones although only four layers are shown in FIG. 1. As previously mentioned, layer 0 is defined as being between $z=0$ and $z=z_0$ where z is the vertical coordinate. Layer 0 is capped by nearly impermeable layer 1 which is defined as being between $z=z_0$ and $z=z_1$. Above layer 1 is a permeable stratum, layer 2, which is defined as being between $z=z_1$ and $z=z_2$. Layer 2 in turn is assumed to be overlain by another nearly impermeable shale or shaly sand layer 3. For purposes of modeling with a reservoir simulator such as ECLIPSE (a trademark of Schlumberger), GEM (a trademark of Computer Modelling Group), or TOUGH2 (Lawrence Berkeley National Laboratory), layer 0 is assumed to be 30 meters thick, layer 1 is assumed to be 10 meters thick, and layer 2 is assumed to be 30 meters thick. The thickness of layer 3 is irrelevant for purposes of analysis. Layer 1 is assumed to have a porosity of 0.05 (dimensionless) and a permeability of 0.01 mD (which is higher than what is typically expected downhole for impermeable zones). Layers 0 and 2 are assumed to have a porosity of 0.2 and a permeability of 100 mD. The radius of wellbore 20 is assigned to be 0.1 m, and the outer radius of the formation 10 is set at 2000 m.

Figure 2:
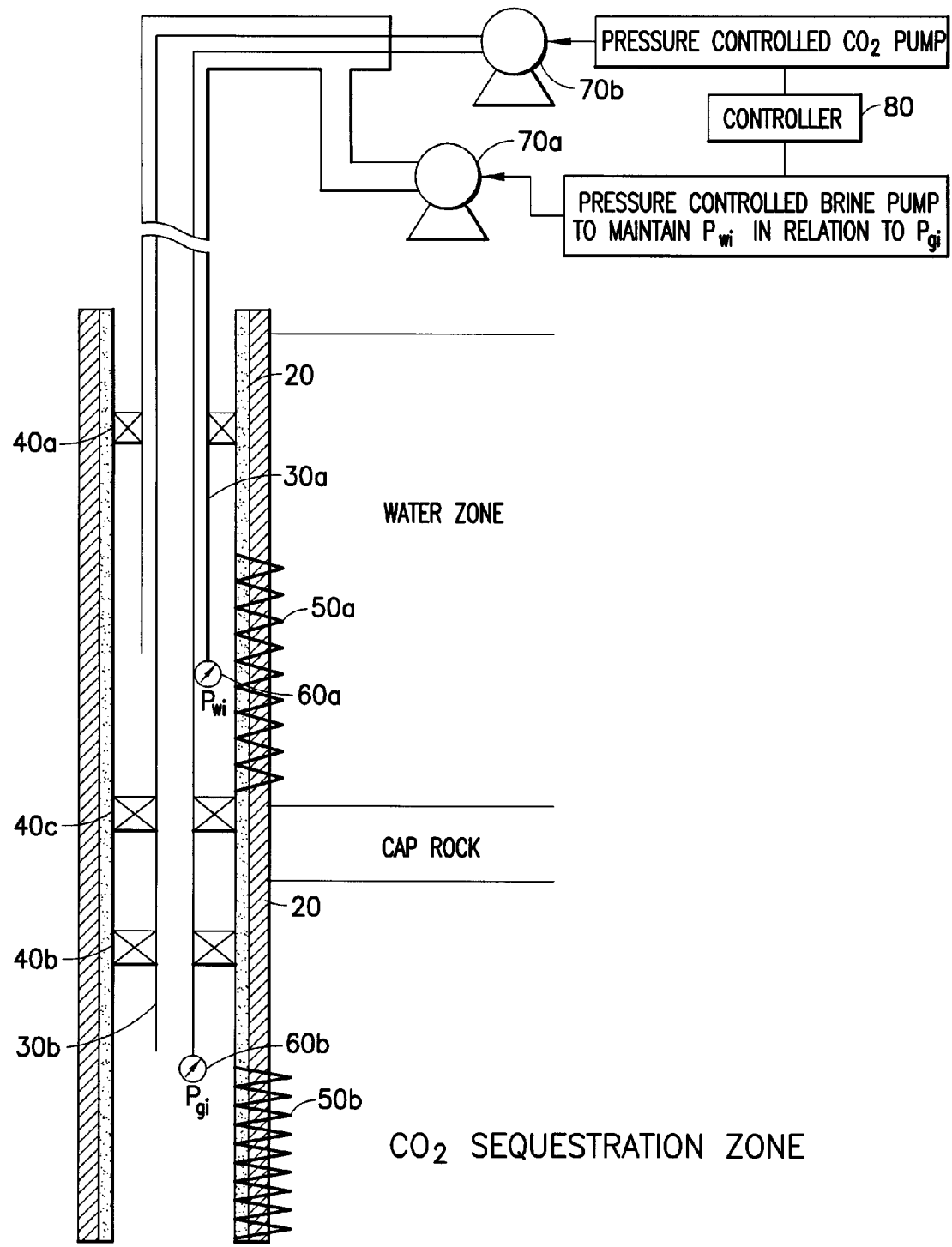
FIG. 2 is a schematic showing a dual-completion well for sequestration of carbon dioxide.

As seen with reference to FIG. 2, the wellbore 20 is assumed to have a dual completion installed. Thus, coaxial tubes 30a, 30b are provided with respective packers 40a, 40b, 40c such that tube 30a is in fluid communication with layer 2 of the formation via casing perforations 50a, and tube 30b is in communication with layer 0 of the formation via casing perforations 50b. Pressure sensors 60a, 60b are provided in conjunction with tubes 30a and 30b with the assumption that the measured pressure is at the top of the respective perforations for the purpose of reference datum. Any other datum is equally acceptable, as long as the hydrostatic correction is applied properly. Supercritical carbon dioxide is injected by suitable means, e.g., pressure controlled pump 70b into layer 0 via tube 30b (displacing brine in that layer). Benign fluid, such as compatible water (e.g., brine) (hereinafter referred to as "water") is injected by suitable means, e.g., pressure controlled pump 70a into layer 2 via tube 30a at a pressure equal to that of the pressure of layer 0 corrected for the gravitational head of the respective fluids, minus a fraction of the entry capillary pressure of carbon dioxide into the nearly impermeable cap-rock layer. The pressure of pumps 70a, 70b is preferably controlled by a controller 80 which receives information from pressure sensors 60a, 60b and which causes the pumps 70a, 70b to pump the supercritical carbon dioxide and water into layers 0 and 2 of the formation as described more completely hereinafter in order to properly sequester the carbon dioxide in layer 0. More particularly, if $z=z_{m0}$ is the pressure measurement point for layer 0, and $z=z_{m2}$ is the pressure measurement point for layer 2, then according to one aspect of the invention, the water injection pressure $p_{wi}$ (measured by sensor 60a) is kept at least $$p_{wi} = p_{gi} - \rho_g g(z_0 - z_{m0}) + \rho_w g(z_0 - z_{m2}) - p_b \quad (1)$$

where $p_{gi}$ is the carbon dioxide injection pressure (measured by sensor 60b), g is the acceleration due to gravity, and $\rho_g$ and $\rho_w$ are the densities of the supercritical carbon dioxide and water respectively. It is noted that the second and third terms of the right hand portion of equation (1) is the correction due to the gravitational head of the respective fluids and the fourth term is the entry capillary pressure into the caprock.

According to another aspect of the invention, the water injection pressure may be increased to levels higher than the level of equation (1). More particularly, in one embodiment, the water injection pressure is increased to the gravity head corrected injection pressure of carbon dioxide i.e., the first three right hand terms of equation (1). In another embodiment, the water injection pressure is increased by a value equal to half the entry capillary pressure of carbon dioxide into layer 1 from equation (1). By increasing the pressure in layer 2 by this amount, carbon dioxide from layer 0 will not penetrate layer 1, as the higher pressure in water provides a safety margin. In a controlled water injection process, the increased value from equation (1) may range from one-quarter to three quarters the entry capillary pressure of the caprock.

By keeping the water pressure at or above the pressure dictated by equation (1), vertical migration of carbon dioxide is suppressed other than purely by diffusion. Diffusion of the carbon dioxide is not of particular concern, however, because the diffusion time scale $T_D$ through layer 1 will typically be thousands of years. More particularly, if the characteristic diffusion constant is D, then the diffusion time $T_D$ is $$T_D = \frac{\phi_1 F_1 h_1^2}{D} \quad (2)$$

where $F_1$ is the formation factor for layer 1, $h_1$ is the layer thickness, and $\phi_1$ is the porosity. For nominal parameter values (e.g., $\phi_1=0.05$, $F_1=(1/\phi_1)^2$, $D=10^{-9}$ m$^2$s$^{-1}$, $h_1=10$ m), the diffusion time $T_D$ will be about 60,000 years and is of little relevance to short and medium term leak mitigation.

In a simulation of two-phase flow, the system of FIG. 1 was utilized. It is assumed that at radial boundary of the formation (e.g., 2000 m), quiescent reservoir pressure gradient is maintained. For capillary pressure, drainage and imbibition capillary pressures according to R. H. Brooks and A. T. Corey, "Properties of Porous Media Affecting Fluid Flow", *J. Irrig. Drainage Div.*, 92 (IR2):61-88 (1966), and T. S. Ramakrishnan and D. Wilkinson, "Formation Producibility and Fractional Flow curves from Radial Resistivity Variation Caused by Drilling Fluid Invasion", *Phys. Fluids*, 9(4):833-844 (1997) are used, with the entry capillary pressure $p_b$ for the layer of interest defined by $$p_b = C\gamma\sqrt{\frac{\phi}{k}} \quad (3)$$

where $\gamma$ is the interfacial tension between carbon dioxide and water, and C is typically a fraction less than unity (e.g., 0.2). Thus, for layer 1, the porosity ($\phi_1$) and permeability ($k_1$) of layer 1 are utilized in equation (3). As previously mentioned, equation (3) may be utilized for purposes of determining a desired water injection pressure into layer 2. Thus, in accord with one aspect of the invention, the water injection pressure is chosen to be a value equal to the value dictated by equation (1) where $p_b$ is given by equation (3). Most preferably, the water injection pressure is chosen to be the value dictated by equation (1) plus one-half the value dictated by equation (3). According to another aspect of the invention, the water injection pressure may be chosen to be $$p_{wi} = p_{gi} - \rho_g g(z_0 - z_{m0}) + \rho_w g(z_0 - z_{m2}) - \alpha p_b \quad (4)$$

where $\alpha$ is a number in the range 0 to 1. Preferably $\alpha$ is between 0.25 and 0.75.

For the purpose of illustrating the feasibility of the invention through reservoir simulation, in terms of fluids, brine is considered displaced through nonwetting supercritical carbon dioxide injection. Injection of carbon dioxide is confined to layer 0. The density of the supercritical carbon dioxide is set at 700 kg/m$^3$ at 15 MPa, with a compressibility and viscosity of $3\times10^{-8}$ Pa$^{-1}$ and $6\times10^{-5}$ Pa-s respectively. The resident brine and the injected water are assigned a density of 1100 kg/m³ and a viscosity of 6×10⁻⁴ Pa-s. Compressibility effect for the aqueous phase is negligible and is therefore ignored. During injection of carbon dioxide and subsequent counter imbibition, residual saturations (of brine and carbon dioxide respectively) are left behind. For residual water saturation, i.e., the maximum fraction of the pore volume occupied by the trapped wetting phase, a value of 0.075 is assigned. For the maximum residual carbon dioxide saturation, a value of 0.3 is used. Before commencement of injection, the pressure at the top of layer 2 is 13 MPa; i.e., this is the initial reservoir pressure at the top of layers of interest in the illustration. Carbon dioxide injection is assumed to occur through the bottom ten meters of the thirty meter layer 0, at a fixed pressure.

With the formation described above with reference to FIG. 1, and with the formation simulation values as described above, simulations were run for three different scenarios. In a first scenario (Example 0), it was assumed that carbon dioxide was injected into layer 0 without injection of water into layer 2. In a second scenario (Example 1), it was assumed that carbon dioxide was injected into layer 0 and water was simultaneously injected into the bottom two meters of layer 2. In a third scenario (Example 2), it was assumed that carbon dioxide was injected into layer 0 and water was simultaneously injected along the entire length of layer 2.

Figure 3A:
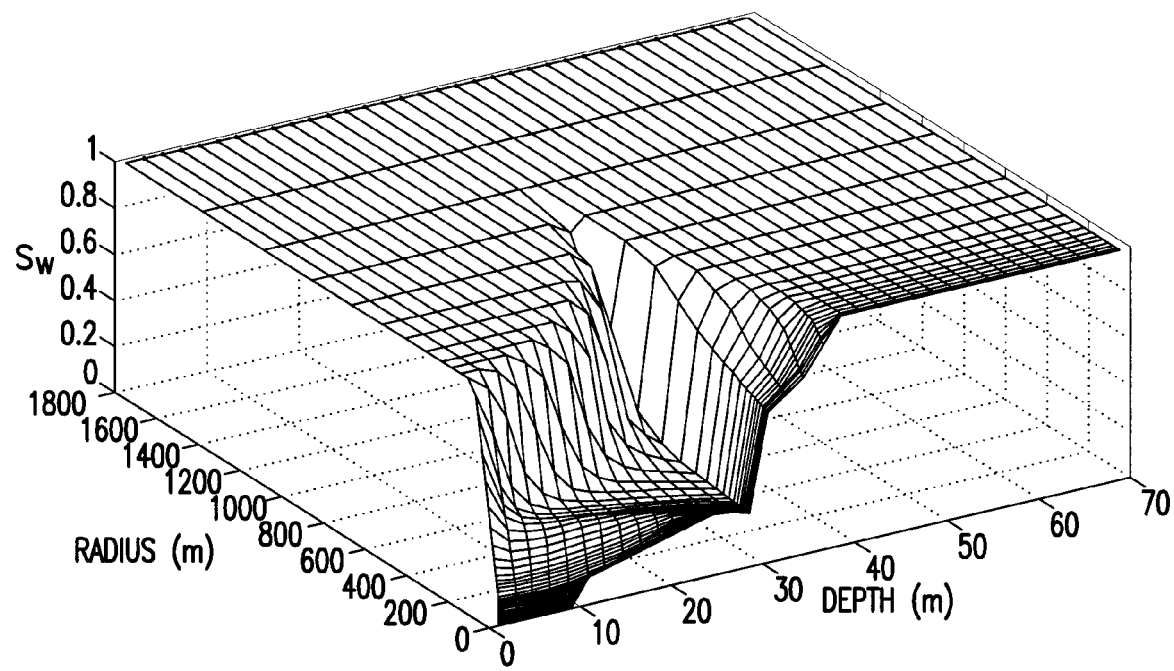
FIG. 3A is a three-dimensional plot generated from a model assuming no injection of water in a permeable zone above the cap-rock of the sequestration zone, and indicating limited migration of carbon dioxide.

More particularly, Example 0 is considered as a baseline for the purpose of characterizing carbon dioxide leakage in the absence of the method of the invention. The model assumes that carbon dioxide injection is carried out at a fixed layer 0 top-perforation pressure of 17 MPa for 730 days. Over the 730 days, 1.137 Tg (1 Tg=10⁶ metric tons) of carbon dioxide is injected into the formation. FIG. 3A is a plot generated by the model which shows the results of the carbon dioxide injection. As can be seen from FIG. 3A (where depth 0 correlates to the beginning or bottom of layer 0), wherever the water saturation $S_w$ is less than one, carbon dioxide is present. Thus, in layer 0 (0 to 30 meters), the carbon dioxide has migrated such that brine has been at least partially displaced radially over 800 meters. In layer 1 (from 30 to 40 meters), the carbon dioxide has migrated about 400 meters (between about 30 and 32 meters). Although impossible to see in FIG. 3A, the model reveals that carbon dioxide is about to break through into layer 2 in the proximity of the wellbore.

Figure 3B:
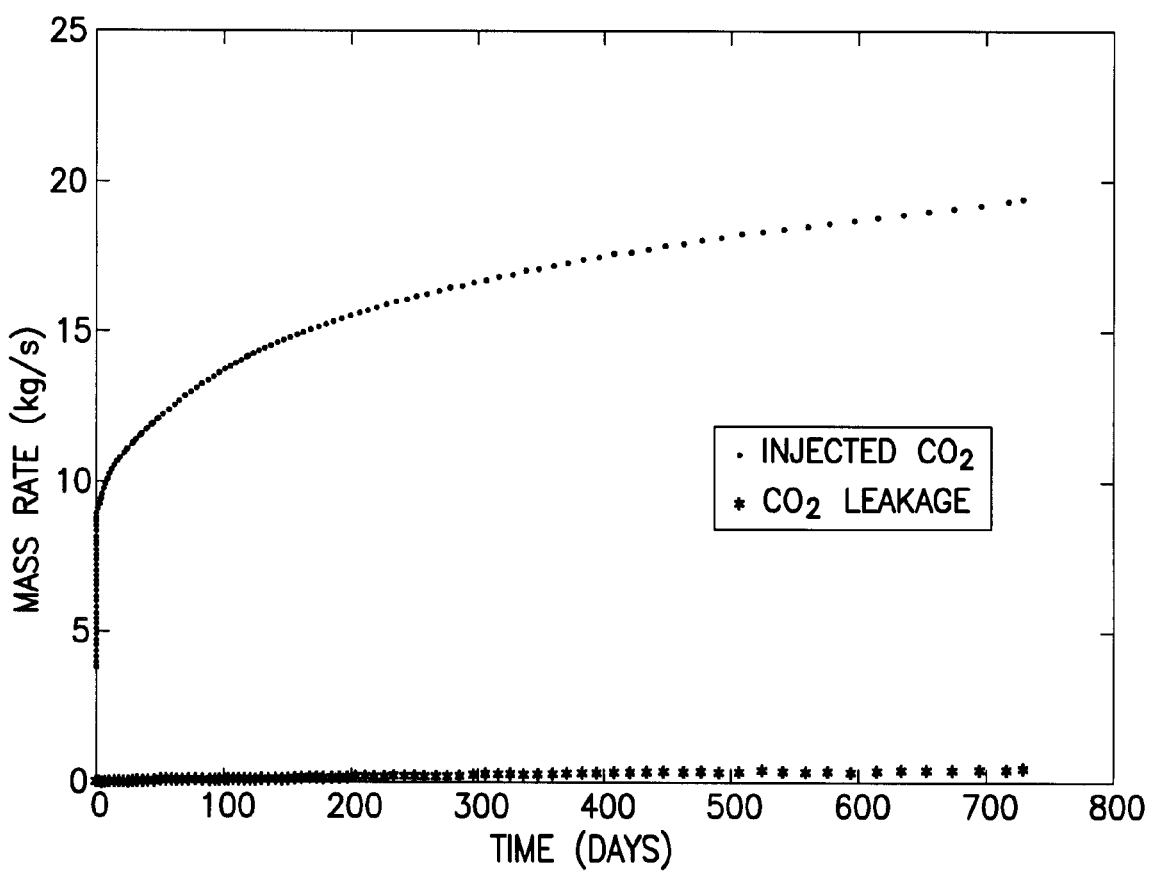
FIG. 3B is a graph showing injection and leakage rates of carbon dioxide for the model of FIG. 3A.

FIG. 3B shows the injection rate for carbon dioxide over the 730 days and the carbon dioxide leakage (into layers 1 and 2). While the cumulative leakage amounted to 12.9 Gg, which is only approximately 1.14% of the cumulative injected carbon dioxide, it represents a concern.

Figure 4A:
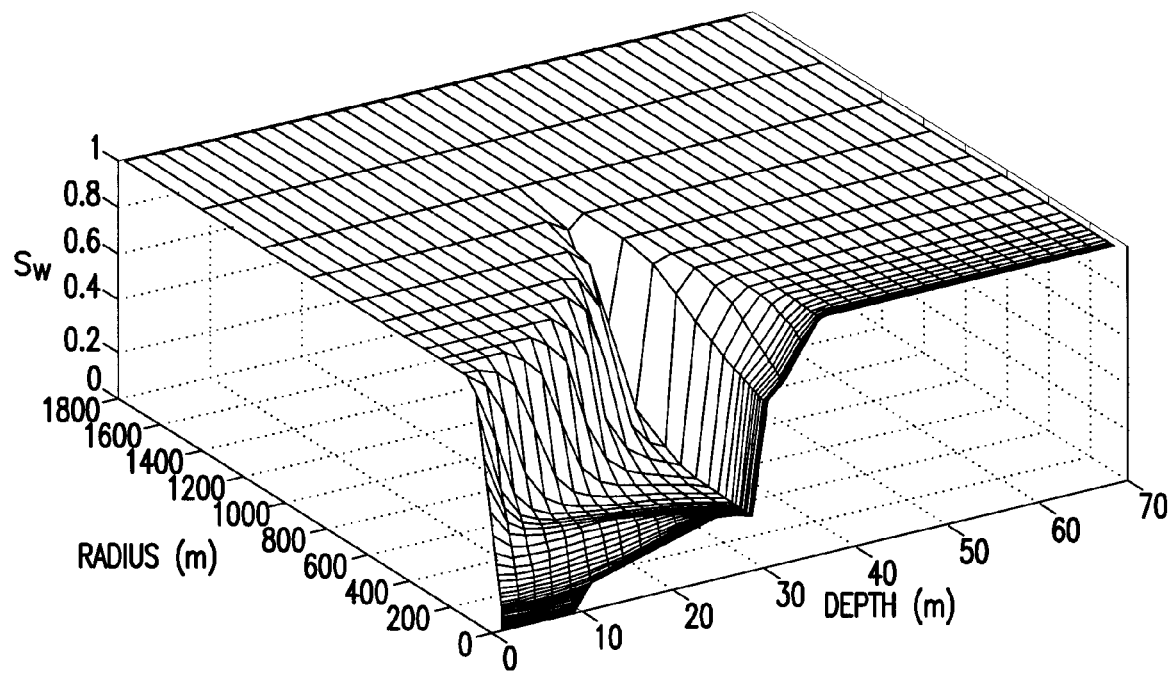
FIG. 4A is a three-dimensional plot generated from a model assuming injection of water in a small portion of a permeable zone above the cap-rock of the sequestration zone, and indicating more limited migration of carbon dioxide.

Example 1 considers the simultaneous injection of water and carbon dioxide. The model assumes that carbon dioxide injection is carried out at a fixed layer 2 top-perforation pressure of 17 MPa for 730 days. Over the 730 days, 1.133 Tg of carbon dioxide is injected (the total being marginally less than Example 1 because of the effects of water injection into layer 2). The model also assumes that the wellbore is perforated at the bottom two meters of layer 2, and the pressure at the top of this perforated interval was specified to be 16.53 MPa (which was above the 15.89 MPa calculated by equation (4), for $\alpha=1$, and slightly above the 16.32 MPa obtained from equation (4) with $\alpha=\frac{1}{2}$, but below 16.77 MPa with $\alpha=0$; the value used was $\alpha\approx\frac{1}{4}$). FIG. 4A is a plot generated by the model which shows the results of the carbon dioxide injection. As can be seen from FIG. 4A, wherever the water saturation $S_w$ is less than one, carbon dioxide is present. Thus, in layer 0 (0 to 30 meters), the carbon dioxide has migrated such that brine has been at least partially displaced radially over 800 meters. In layer 1 (from 30 to 40 meters), the carbon dioxide has migrated radially about 400 meters (between about 30 and 32 meters). The model reveals that for Example 1, the carbon dioxide has not broken through into layer 2 at all.

Figure 4B:
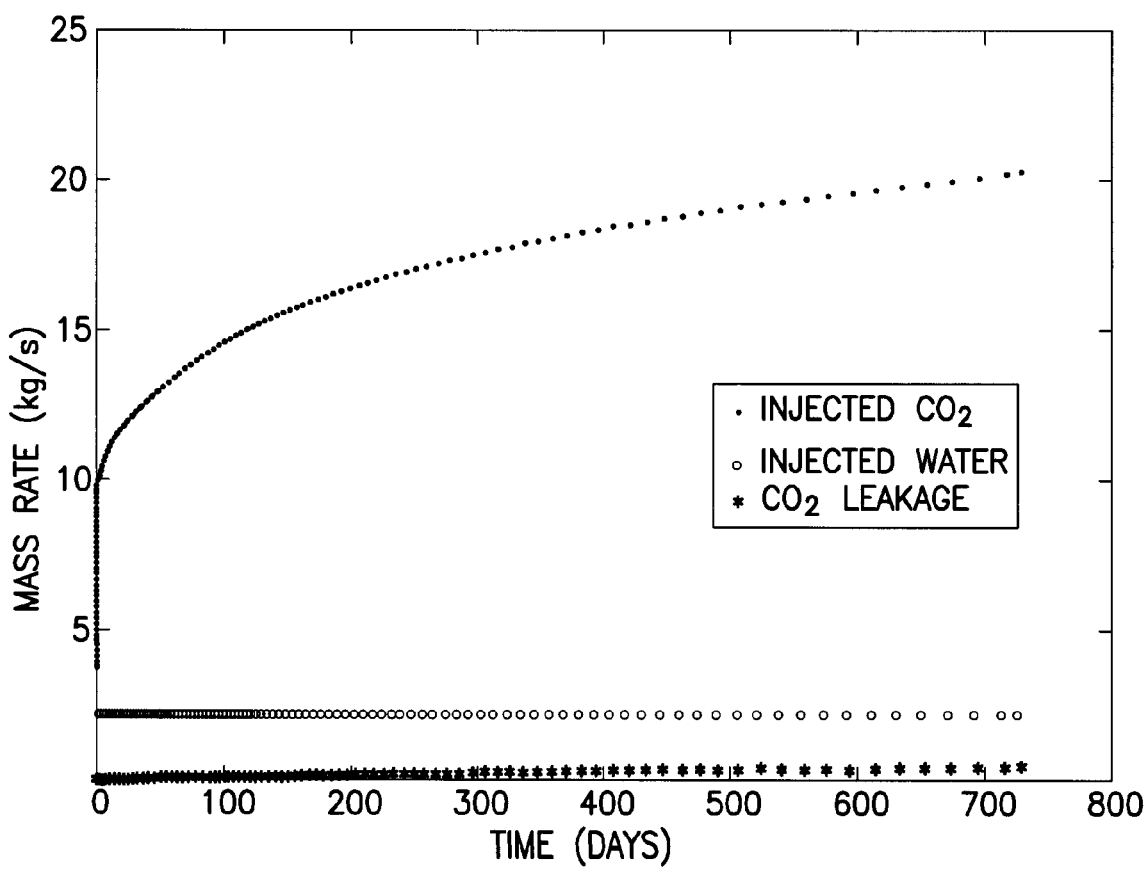
FIG. 4B is a graph showing injection rates of carbon dioxide and water, and the leakage rate of carbon dioxide for the model of FIG. 4A.

FIG. 4B shows the injection rates for carbon dioxide and water for the 730 days and the carbon dioxide leakage (into layer 1) over that period of time. The cumulative leakage amounted to 10.1 Gg, which is approximately 0.9% of the cumulative injected carbon dioxide. This represents an improvement of approximately 25% relative to Example 0 and is therefore useful. However, the 0.9% leakage rate is still not ideal.

Figure 5A:
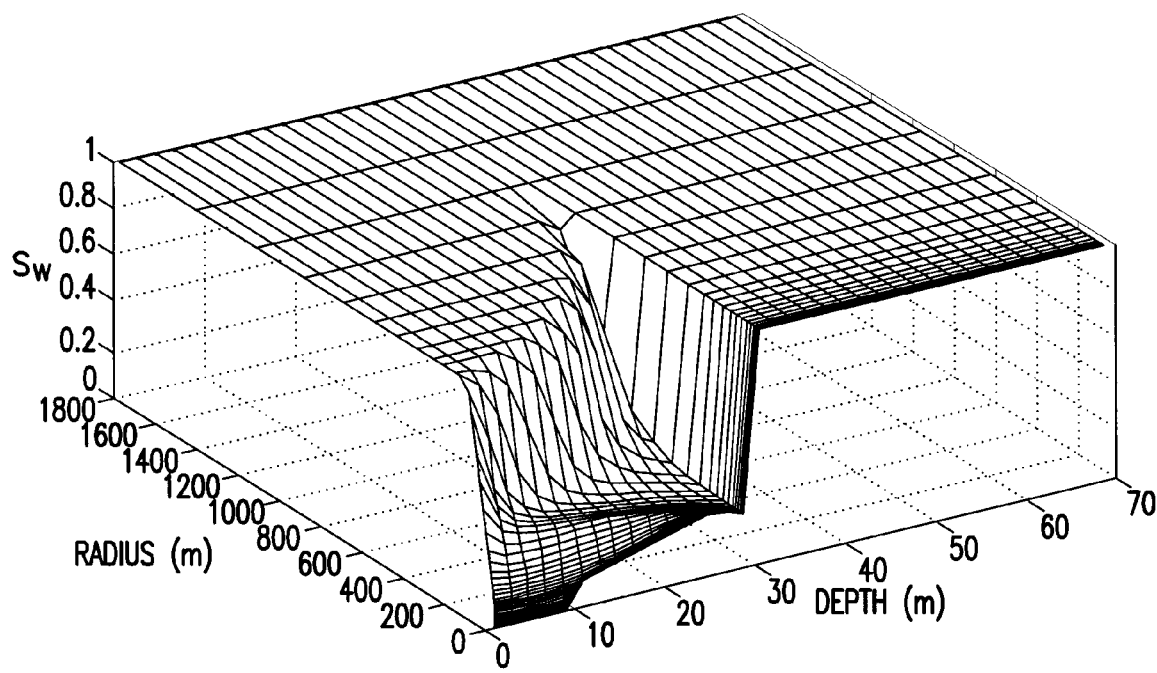
FIG. 5A is a three-dimensional plot generated from a model assuming injection of water in the entire permeable zone above the cap-rock of the sequestration zone, and indicating very little migration of carbon dioxide.

Example 2 considers the simultaneous injection of water and carbon dioxide where water is injected over the entire layer 2 interval. The model assumes that carbon dioxide injection is carried out at a fixed top-perforation pressure of 17 MPa for 730 days. Over the 730 days, 1.115 Tg of carbon dioxide is injected. The model also assumes that the wellbore is perforated along all thirty meters of layer 2, and the pressure at the top of this perforated interval was specified to be 16.23 MPa (which is above the 15.59 MPa for $\alpha=1$ calculated by equation (4), and even above the 16.01 MPa obtained from equation (4) with $\alpha=\frac{1}{2}$, but below the 16.44 MPa obtained from equation (4) with $\alpha=0$; the value used was $\alpha\approx\frac{1}{4}$). FIG. 5A is a plot generated by the model which shows the results of the carbon dioxide injection. As can be seen from FIG. 5A, wherever the water saturation SW is less than one, carbon dioxide is present. Thus, in layer 0 (0 to 30 meters), the carbon dioxide has migrated such that brine has been at least partially displaced radially over 800 meters. However, importantly, the model concludes that the migration of carbon dioxide into layer 1 is negligible.

Figure 5B:
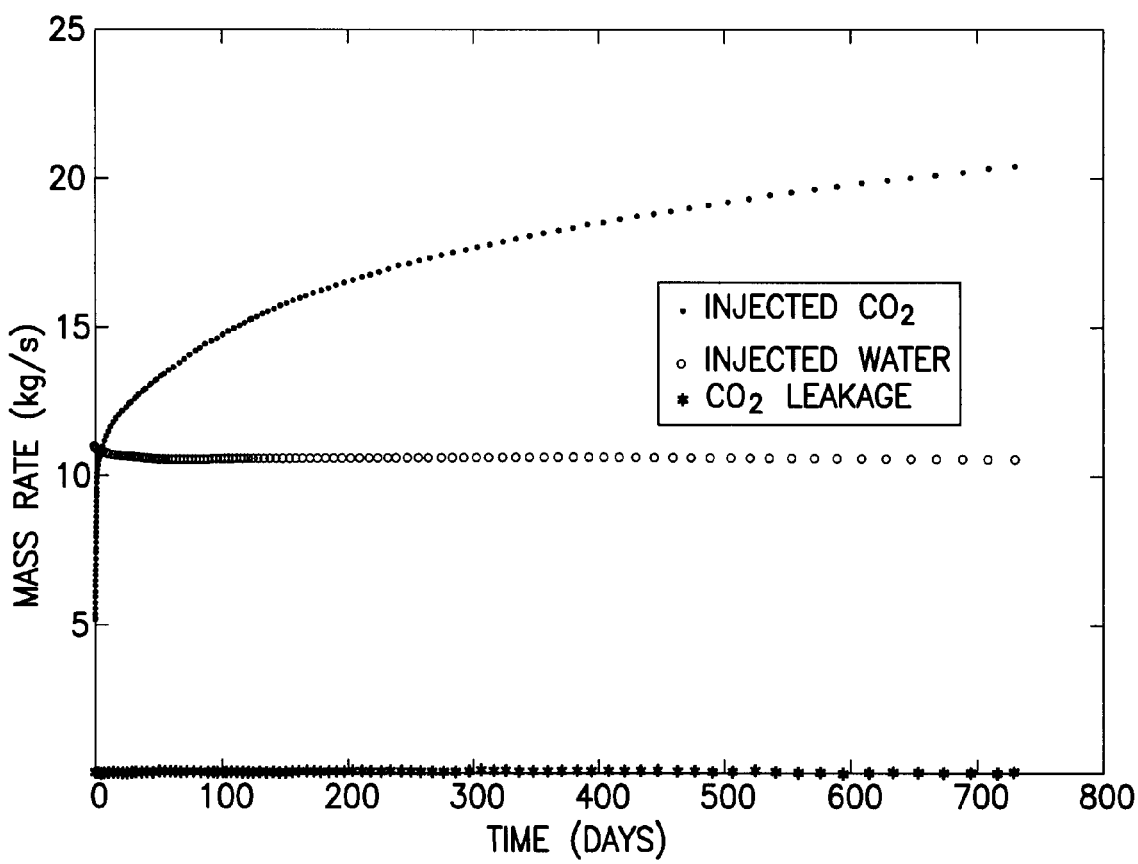
FIG. 5B is a graph showing injection rates of carbon dioxide and water, and leakage rate of carbon dioxide for the model of FIG. 5A.

FIG. 5B shows the injection rates for carbon dioxide and water for the 730 days and the negligible leakage of carbon dioxide into layer 1 over that period of time. Thus, the arrangement of Example 2 is superior in sequestering carbon dioxide. A side-by-side comparison of the baseline of Example 0, and Examples 1 and 2 is seen in the following table.

| Example # | Cum. Inj. CO2 (Tg) | Leaked CO2 (Tg) | % | Inj. Water (Tg) | % |
|---|---|---|---|---|---|
| 0 | 1.1367 | 0.01293 | 1.138 | — | — |
| 1 | 1.1329 | 0.01014 | 0.895 | 0.1168 | 10.31 |
| 2 | 1.1153 | 0.00007 | 0.006 | 0.6561 | 58.82 |

It is noted that while the water was injected over a length of thirty meters in Example 2 relative to the two meters in Example 1, the injection rate of the water, and hence the total amount of water injected is approximately six times the injection rate and total injection amount of Example 1 (compare FIG. 5B to FIG. 4B) less than the fifteen times one would expect based on length of perforations. This is because water injected into the bottom 2 m spreads over the entire width of layer 2 as it moves radially into the formation.

According to another aspect of the invention, it is possible to simulate different perforation lengths in the water zone less than the maximum length, and compare the total injected water and the total carbon dioxide leakage. Then, it should be possible to find a minimum perforation length where the total carbon dioxide leakage is acceptable. That perforation length can be considered optimal as using the least water which will lead to the said acceptable carbon dioxide leakage.

Based on all of the foregoing, one method according to the invention includes: a) choosing a sequestration site for the purpose of carbon dioxide sequestration by finding a permeable layer (e.g., >1 mD) which is overlain by a nearly impermeable layer (e.g., <0.01 mD), which in turn is overlain by a permeable layer; b) completing the well with dual completions and with perforations for the purpose of injecting carbon dioxide into the lower permeable layer and injecting water (brine) or a substantially inert (benign) fluid into the overlaying permeable layer; and c) injecting carbon dioxide and water into their respective layers simultaneously, with the nearly impermeable layer there-between, where the water is injected into its layer at a pressure of at least $$p_{wi} = p_{gi} - \rho_g g(z_0 - z_{m0}) + \rho_w g(z_0 - z_{m2}) - p_b$$

and at most $$p_{wi} = p_{gi} - \rho_g g(z_0 - z_{m0}) + \rho_w g(z_0 - z_{m2}).$$

In order to choose the sequestration site, logs of the formation should be reviewed. The logs can be sonic logs, acoustic logs, nuclear logs, magnetic resonance logs, electromagnetic logs, formation testing logs, or any other log or combination of logs which provides an indication of the depth and location of the layers of the formation and an indication of the permeability of the layers.

Dual completion of the wellbore may be accomplished according to any desired technique. Likewise, perforation of the wellbore may be accomplished according to any desired technique.

According to one aspect of the invention, the water is injected at a pressure equal or greater than $$p_{wi} = p_{gi} - \rho_g g(z_0 - z_{m0}) + \rho_w g(z_0 - z_{m2}) - C\gamma\sqrt{\frac{\phi_1}{k_1}}$$

and preferably less than $p_{wi} = p_{gi} - \rho_g g(z_0 - z_{m0}) + \rho_w g(z_0 - z_{m2})$, where C is between 0.1 and 0.3 and preferably 0.2.

According to another aspect of the invention, the water is injected at a pressure in the range of $$p_{wi} = (p_{gi} - \rho_g g(z_0 - z_{m0}) + \rho_w g(z_0 - z_{m2})) - (.5 \pm .25)C\gamma\sqrt{\frac{\phi}{k}},$$

where C is between 0.1 and 0.3 and preferably 0.2.

According to a further aspect of the invention, the water is injected into the overlaying permeable layer along a length nearest the impermeable layer.

According to a further aspect of the invention, using information regarding the formation layers, simulations are conducted to find a desired length of the overlaying permeable layer to perforate. The simulations should provide indications of carbon dioxide leakage, if any, from the first permeable layer as a function of the length of the perforation. Preferably, the simulations also provide the amount of water injected into the overlaying permeable layer.

According to yet another aspect of the invention, the pressure in both injection intervals is measured downhole. According to another aspect of the invention, a control system (not shown) may be provided to maintain the injection pressures in the respective completions.

According to even another aspect of the invention, carbon dioxide is sequestered in a formation where the first permeable layer is relatively large (e.g., a depth of more than 30 m), and the permeable layer (layer 2) overlaying the non-permeable layer is relatively thin (e.g., a few meters thick) and has a permeability substantially less than the first permeable layer. In this manner, the amount of water which should be injected into layer 2 is reduced as the volume of water expected to be injected scales with the product of the permeability and thickness of layer 2.

There have been described and illustrated herein several embodiments of a system and a method of sequestering carbon dioxide in a formation. While particular embodiments of the invention have been described, it is not intended that the invention be limited thereto, as it is intended that the invention be as broad in scope as the art will allow and that the specification be read likewise. Thus, while particular simulation tools have been disclosed for the purpose of determining an optimal perforation length with respect to preventing carbon dioxide leakage while minimizing water usage, it will be appreciated that other simulation tools could be used as well. It will therefore be appreciated by those skilled in the art that yet other modifications could be made to the provided invention without deviating from its spirit and scope as claimed.

What is claimed is:

1. A method for sequestration of carbon dioxide in a formation traversed by a cased wellbore, comprising:
   a) finding a location in the formation having a first permeable layer directly overlain by a nearly impermeable layer, which in turn is overlain by a second permeable layer;
   b) completing the wellbore as a dual completion wellbore and with perforations in the casing for the purpose of injecting carbon dioxide into the first permeable layer and injecting water into the second permeable layer; and
   c) injecting carbon dioxide and water into their respective layers simultaneously, with the nearly impermeable layer therebetween, where the water is injected at a pressure of at least $$p_{wi} = p_{gi} - \rho_g g(z_0 - z_{m0}) + \rho_w g(z_0 - z_{m2}) - C\gamma\sqrt{\frac{\phi_1}{k_1}},$$

where $p_{wi}$ is the water injection pressure, $p_{gi}$ is the carbon dioxide injection pressure, g is the acceleration due to gravity, $\rho_g$ and $\rho_w$ are the densities of the carbon dioxide and water respectively, $z_{m0}$ is the measurement point for pressure in said first permeable layer, $z_{m2}$ is the measurement point for pressure in said second permeable layer, $z_0$ is the depth at the top of the first permeable layer, $\gamma$ is the interfacial tension between said carbon dioxide and said water, $\phi_1$ and $k_1$ are the porosity and the permeability of said nearly impermeable layer, and C is a constant.

2. A method according to claim 1, wherein:
said water is injected at a pressure less than or equal to $$p_{wi} = p_{gi} - \rho_g g(z_0 - z_{m0}) + \rho_w g(z_0 - z_{m2}).$$

3. A method according to claim 2, wherein:
said water is injected at a pressure approximately equal to $$p_{wi} = (p_{gi} - \rho_g g(z_0 - z_{m0}) + \rho_w g(z_0 - z_{m2})) - \frac{1}{2}C\gamma\sqrt{\frac{\phi_1}{k_1}}.$$

4. A method according to claim 3, wherein:
C has a value between 0.1 and 0.3.

5. A method according to claim 1, wherein:
said finding comprises reviewing logs of the formation, said logs including indications of a plurality of layers in the formation including said first permeable layer, said nearly impermeable layer and said second permeable layer, and indications of permeability of said plurality of layers in the formation.

6. A method according to claim 1, wherein:
said completing comprises perforating the casing adjacent the second permeable layer at a lower portion of said second permeable layer adjacent said nearly impermeable layer.

7. A method according to claim 1, wherein:
said completing comprises perforating the casing adjacent the second permeable layer along a lower bottom half of said second permeable layer.

8. A method according to claim 1, wherein:
said completing comprises perforating the casing adjacent the second permeable layer along the entire second permeable layer.

9. A method according to claim 1, further comprising:
conducting simulations of the formation with different assumptions of length of perforation along said second permeable layer and which provide resultant indications of expected carbon dioxide leakage from the first permeable layer based on said assumptions, and
based on results of said conducting simulations, selecting a length of the casing adjacent said second permeable layer for perforation.

10. A method according to claim 9, wherein:
said selecting comprises selecting a minimum length where expected carbon dioxide leakage is negligible.

11. A method for sequestration of carbon dioxide in a formation traversed by a cased wellbore, comprising:
a) finding a location in the formation having a first permeable layer directly overlain by a nearly impermeable layer, which in turn is overlain by a second permeable layer;
b) running simulations of the formation assuming injection of carbon dioxide into the first permeable layer and injection of water along different lengths of the second permeable layer in order to find a length which provides desired results concerning leakage of carbon dioxide from the first permeable layer;
b) completing the wellbore as a dual completion wellbore and with perforations in the casing along said first permeable layer for the purpose of injecting carbon dioxide into the first permeable layer and with second perforations in the casing along said length which provides desired results for the purpose of injecting water into the second permeable layer; and
c) injecting carbon dioxide and water into their respective layers simultaneously, with the nearly impermeable layer therebetween, where the water is injected at a pressure at least equal to the carbon dioxide injection pressure minus an entry capillary pressure of the carbon dioxide into the said nearly impermeable layer, plus a gravitational head correction for the water and carbon dioxide.

12. A method according to claim 11, wherein:
said water is injected at a pressure at or below said carbon dioxide injection pressure plus said gravitational head correction.

13. A system for sequestration of carbon dioxide in a formation having a surface and thereunder a first permeable layer directly overlain by a nearly impermeable layer, which in turn is overlain by a second permeable layer, the formation being traversed by a cased wellbore, comprising:
a) a first pump coupled to a source of carbon dioxide;
b) a second pump coupled to a source of water;
c) a dual completion of the cased wellbore, said dual completion coupled to said first pump and to said second pump and providing independent communication between the surface and the first permeable layer and between the surface and the second permeable layer, wherein said first pump pumps the carbon dioxide down the dual completion and into the first permeable layer at a first injection pressure, and simultaneously the second pump pumps the water down the dual completion and into the second permeable layer at a second injection pressure, said second injection pressure at least equal to said first injection pressure plus a gravitational head correction for the water and carbon dioxide minus an entry capillary pressure of the carbon dioxide into the nearly impermeable layer.

14. A system according to claim 13, wherein:
said second injection pressure is less than or equal to said first injection pressure plus said gravitational head correction.

15. A system according to claim 14, wherein:
said injection pressure is approximately equal to said first injection pressure plus said gravitational head correction minus one-half said entry capillary pressure.

16. A system according to claim 13, further comprising:
a first pressure sensor in the dual completion, said first pressure sensor sensing said first injection pressure, and
a second pressure sensor in the dual completion, said second pressure sensor sensing said second injection pressure.

17. A system according to claim 16, further comprising:
a controller coupled to said first pressure sensor, said second pressure sensor, said first pump and said second pump.

* * * * *